UNITED STATES PATENT OFFICE 2,584,752

TRIMETHYLSILYLPHENOXY ESTERS

John L. Speier, Jr., Pittsburgh, Pa., assignor to Dow Corning Corporation, Midland, Mich., a corporation of Michigan No Drawing. Application January 8, 1951, Serial No. 205,032

4 Claims. (Cl. 260—448.8)

This invention relates to the condensation products of triorganochlorosilanes and phenoxy alcohols.

It is an object of this invention to prepare organosilicon compounds which are useful in the preparation of organosilyl alcohols. Another object is to prepare compounds which may be employed in novel organic syntheses. Other objects and advantages will be apparent from the following description.

This invention relates to compounds of the formula $R_3SiOCH_2CHR'OC_6H_4Cl$ where R is a monovalent hydrocarbon radical and R' is a methyl radical or hydrogen.

These compounds may be prepared by reacting a chlorosilane of the formula $R_3SiCl$ with an alcohol of the formula $ClC_6H_4OCH_2CHR'OH$. The latter are commercially available products sold under the name "Dowanol." The reaction proceeds at room temperature or above and is preferably carried out under anhydrous conditions and in the presence of a hydrogen halide acceptor such as pyridine or ammonia. For the purpose of this invention R may be any monovalent hydrocarbon radical such as alkyl, phenyl, alkylene, alkaryl, naphthyl, or alkines.

The following examples are illustrative only of this invention and should not be construed as limiting the scope thereof. The scope of the invention is set forth in the appended claims.

Example 1

232 grams of 1-p-chlorophenoxy-2-propanol was dissolved in 200 ml. of dry toluene along with 99 grams of dry pyridine. 150 grams of trimethylchlorosilane was added slowly with shaking and cooling. Pyridine hydrochloride precipitated and was removed by filtration. The reaction product was $p-ClC_6H_4OCH_2CH(CH_3)OSi(CH_3)_3$.

Example 2

172.5 grams of 2-(p-chlorophenoxy)ethanol was dissolved in 400 ml. of toluene. 120 grams of trimethylchlorosilane was added and the mixture was heated to 70° C., at which temperature HCl was evolved steadily for three hours. The mixture was cooled and anhydrous ammonia was bubbled through the mixture until the odor of ammonia persisted. Ammonium chloride was then filtered from the mixture and the filtrate was distilled. 195 grams of 2(p-chlorophenoxy) ethoxytrimethylsilane $$[p-ClC_6H_4OCH_2CH_2OSi(CH_3)_3]$$

was obtained. This compound had a boiling point of 166° C. at 29 mm., $n_D^{25}$ 1.4928, $d_4^{25}$ 1.061, and a specific refraction of .2738.

Example 3

172.5 grams of 2(o-chlorophenoxy)ethanol was reacted with 120 grams of trimethylchlorosilane in accordance with the precise procedure of Example 2. The resulting product was o-chlorophenoxyethoxytrimethylsilane $$[o-ClC_6H_4OCH_2CH_2OSi(CH_3)_3]$$

This material has a boiling point of 158° C. at 26 mm., $n_D^{25}$ 1.4948, $d_4^{25}$ 1.066, and a specific refraction of 0.2735.

That which is claimed is:

1. A compound of the formula $$R_3SiOCH_2CHR'OC_6H_4Cl$$

where R is a monovalent hydrocarbon radical and R' is selected from the group consisting of methyl radicals and hydrogen.

2. $p-ClC_6H_4OCH_2CH(CH_3)OSi(CH_3)_3$.
3. $p-ClC_6H_4OCH_2CH_2OSi(CH_3)_3$.
4. $o-ClC_6H_4OCH_2CH_2OSi(CH_3)_3$.

JOHN L. SPEIER, Jr.

No references cited.